United States Patent [19]
Luft et al.

[11] 3,755,193
[45] Aug. 28, 1973

[54] PROCESS FOR THE FABRICATION OF NITROGEN CONTAINING PULVERIZED CARBON

[75] Inventors: Gunter Luft, Lauf; Gerhard Richter; Erhard Weidlich, both of Erlangen, all of Germany

[73] Assignee: Siemens Aktiengesellschaft, Berlin and Munich, Germany

[22] Filed: Feb. 4, 1972

[21] Appl. No.: 223,548

[30] Foreign Application Priority Data
Feb. 22, 1971   Germany.................. P 21 08 417.3

[52] U.S. Cl.................. 252/422, 136/122, 423/449
[51] Int. Cl............................................. C01b 31/08
[58] Field of Search........................... 136/121, 122; 252/422, 425, 447; 117/46 CC, 46 CB; 423/449

[56] References Cited
UNITED STATES PATENTS

| | | | |
|---|---|---|---|
| 3,248,303 | 4/1966 | Doying............................. | 252/425 X |
| 3,297,490 | 1/1967 | Barber et al....................... | 136/122 |
| 3,547,677 | 12/1970 | Gentilhomme et al........ | 423/449 X |

*Primary Examiner*—L. Dewayne Rutledge
*Assistant Examiner*—M. J. Andrews
*Attorney*—Arthur E. Wilfond, Herbert L. Lerner et al.

[57] ABSTRACT

A process for the fabrication of nitrogen containing pulverized carbon for incorporation thereof as an electrode material for electrochemical cells, particularly fuel cells. A carbonizable, nitrogen containing organic polymer is completely dissolved while being heated in a concentrated salt solution of an inorganic halides or thiocyanate. The resultant highly viscous fluid is carbonized at temperatures between 700° and 1200°C and the resultant product is crushed.

6 Claims, 1 Drawing Figure

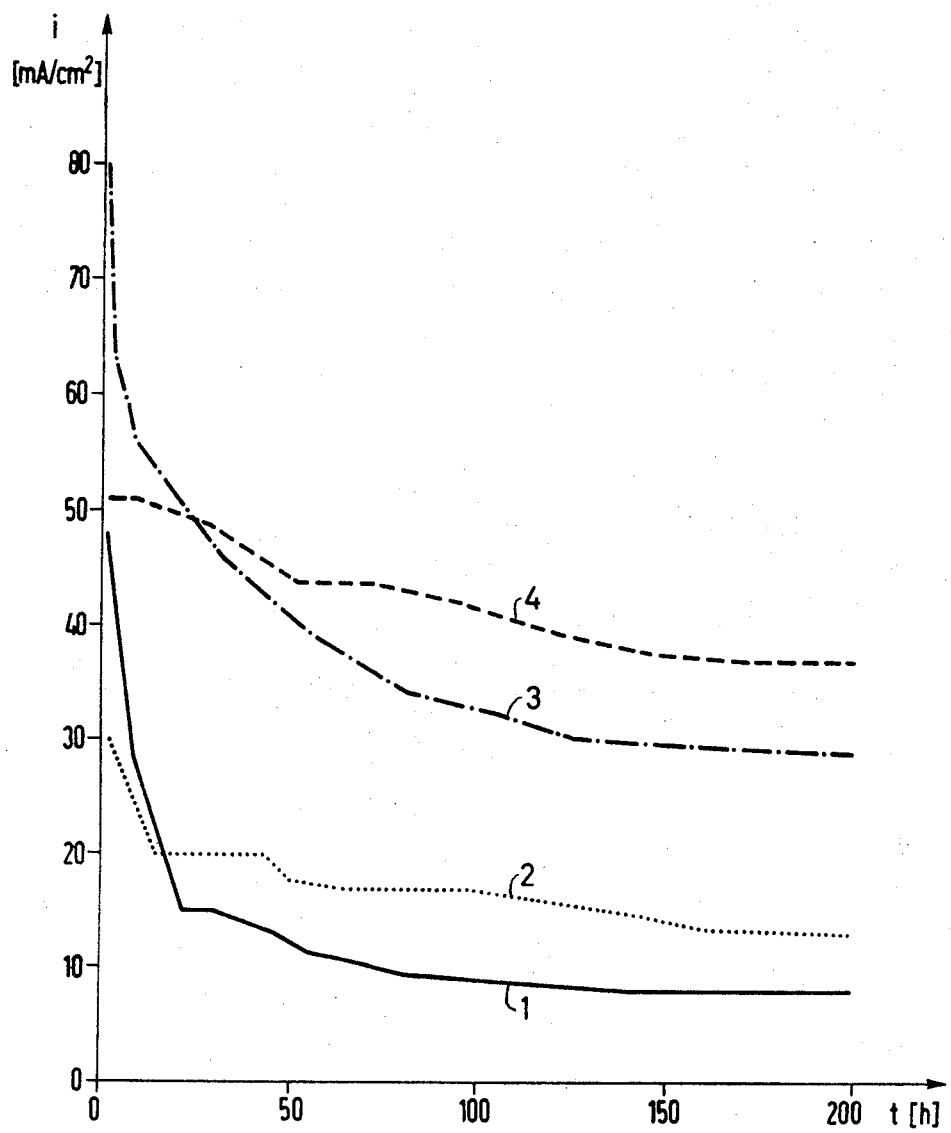

PROCESS FOR THE FABRICATION OF NITROGEN CONTAINING PULVERIZED CARBON

The invention relates to a process for the making of nitrogen containing pulverized carbon as an electrode material for electrochemical cells, particularly fuel elements.

The use of carbon as an electrode material in electrochemical cells is known as such. In accordance with the electrode reaction which is to be carried out, carbon may serve as a catalyzer or as a catalyzer carrier. Since carbon does not act as a catalyzer for hydrogen activation, carbon may be used, for instance, in fuel elements in which hydrogen is used as a fuel gas, as a catalyzer carrier which contains small quantities of a catalyzer such as platinum or Raney-nickel, for the purpose of oxidizing the hydrogen. Since, however, carbon demonstrates a certain activity in respect to oxygen reduction, carbon, for instance, may be used as an electrode material for the cathode in fuel elements in which oxygen or air is used as an oxidizing medium.

Catalyzers for oxygen reduction, apart from the catalyzing activity, must fulfill other requirements. They must be available in sufficient quantities and at a reasonable price, and they should demonstrate a good stability. Carbon, of course, is available in sufficient quantity and at a favorable price; it is also a good conductor and the corrosion within the range of the oxygen potentials appears to be tolerable; the activity, however, in connection with the oxygen reduction, is quite modest. Therefore, in many cases, additional metallic or oxydic catalyzers are introduced into the carbon.

It is further known to activate carbon through the inclusion of nitrogen, whereby a noticeable improvement in its performance may be obtained. The activation may be obtained in a manner whereby carbon is tempered in an ammonia atmosphere. Nitrogen containing carbons may also be obtained through the carbonization of materials such as gelatin, hexamethylentetramine, amines, urea and other animal products.

Although, during the disintegration of hydrogen peroxyde and also during the use for oxygen reduction in fuel elements with alkaline electrolytes, these carbons demonstrate a useful catalytic activity, such electrodes do not show a satisfactory performance during the oxygen reduction in fuel elements with acidic electrolytes. Thus, particularly, in the known carbons during long term experiments, the observed deactivation is very troublesome. This deactivation, which has its origin in the anodic dissolution of the carbon, may remain, however, within tolerable limits with the use of carbon in fuel cell elements with alkaline electrolytes and at room temperature. The deactivation, however, during use in practical, heavy duty fuel cell batteries with acidic electrolytes makes a disadvantageous and troublesome appearance. Such fuel cell batteries are operated, for reasons of water depletion and heat removal at temperatures of up to 60°C and higher, wherein the deactivation may occur to an extent which is no longer tolerable.

It is the task of the invention to provide a method for the production of nitrogen containing pulverized carbon as an electrode material for electrochemical cells, particularly fuel cells, by which carbon is obtained, in which the difficulties mentioned above do not occur. Particularly, a carbon is to be fabricated with improved catalytic activity and increased stability.

In accordance with the invention, this is attained by completely dissolving a carbonizable, nitrogen containing organic polymer, by heating in a concentrated salt solution of an inorganic halides or thioyanate, and in that the high viscosity liquid obtained thereby is carbonized at temperatures between 700° and 1200°C and the resulting product is then ground.

In an especially advantageous embodiment of the process in accordance with the invention, for instance, polyacrylonitrile is added to a concentrated watery solution of zinc chloride in a proportion of the polyacrylonitrile to the salt of 1:1 to 1:10, preferably 1:2 to 1:5. The resultant mixture is heated to temperatures of around 100°C until the complete solution of the polyacrylonitrile is obtained and the resultant solution is heated in a nitrogen atmosphere with a heat-up speed of 1° to 10°C per minute, preferably 2° to 6°C per minute, to a temperature of from 700° to 1200°C, preferably 900° to 1000°C, and wherein the temperature is maintained at the final temperature till the conclusion of the carbonization.

Polyacrylonitrile is especially suitable for carbonization, since it does not melt and, during the thermal treatment, few tar-like products are produced therefrom. During the carbonization of polyacrylonitrile, a better yield of carbon with good mechanical properties is obtained. The carbonization product of polyacrylonitrile shows a high nitrogen content which, however, varies with the carbonization temperature. The high nitrogen content distinguishes the carbon obtained through carbonization of polyacrylonitrile also in respect to carbonization products of other nitrogen containing organic substances, in which relatively little nitrogen remains in the end product.

If polyacrylonitrile is heated under argon for one hour to various temperatures, the carbon formed thereby contains the following quantities of nitrogen:

| Temperatures in °C | 600 | 700 | 800 | 900 | 1000 | 1100 |
|---|---|---|---|---|---|---|
| Nitrogen content in percentage of weight | 17.9 | 17.0 | 14.7 | 9.5 | 5.8 | 3.6 |

Carbon which has been obtained through such a thermal treatment, however, demonstrates small activity and, furthermore, has an active surface which is very small. Thus, for instance, for the carbon obtained during the thermal treatment at 800°C, a BET surface area, i.e. a surface area measured according to the method of Brunauer, Emmett and Teller (see: S.J.Gregg and K.S.W.Sing, "Adsorption, Surface Area and Porosity," Academic Press, London and New York, 1967, p. 35 and following), of only about 8 $m^2/g$ has been determined. The total weight loss during the pyrolysis of polyacrylonitrile at a temperature of up to 1000°C comes to about 70 percent. In spite of its otherwise good characteristics, polyacrylonitrile therefore had to be considered useless for the purpose mentioned hereinabove.

While it is known that, during the fabrication of activated carbon from cellulose containing products such as wood flour, chemical activation may be attained through soaking of the primary products with a solution of zinc chloride, potassium sulfide and potassium thiocyanate or phosphoric acid and sulfuric acid, efforts to obtain a corresponding activation also with hydrophobic polymers such as polyacrylonitrile, however, had to be considered as hopeless.

The invention makes use of the fact, that polyacrylonitrile is soluble in certain salt solutions. Such solutions, for instance, become available when the polymerization of acrylnitrile into polyacrylonitrile is carried out in salt solutions. Similarly, this is also true for other nitrogen containing polymers. Surprisingly, from such solutions, in accordance with the process of the invention, a carbon with very high activity and a large surface may be obtained. This carbon furthermore shows an improved conductivity and, moreover, an improved yield of the carbon is obtained through a decreased formation of tarlike products during its manufacture. All of these positive effects have their origin in the beneficial effect of the salts which have been added during the manufacture.

When a carbonizable nitrogen-containing organic polymer, for instance polyacrylonitrile, is completely dissolved under heat in concentrated salt solutions of inorganic halides or thiocyanate, and the resultant solutions are evaporated, highly viscous liquids are obtained which may be carbonized into highly activated carbon with an active surface of 1000 to 1400 $m^2$ per gram. The carbonization temperature is preferably selected to lie between 700° and 1200°C, and is preferably located in the range between 900° and 1000°C. The carbonization temperature is selected in the indicated range in order to obtain a stable carbon with good conduction capability.

The inorganic halides and thiocyanates, which are preferably used as concentrated watery solutions, are used in the form of ammonium salts, alkaline salts, zinc or iron salts, such as $NH_4SCN$, $LiBr$, $NaSCN$, $KSCN$, $ZnCL_2$ or $FeCl_3$.

However, other solvent media may be used, for instance dimethylformamide for zinc chloride, and the salts could, with a correspondingly lower melting point, also be used in the form of fused solutions with correspondingly lower melting points. The ratio of the polymers to the salt may advantageously lie between 1:1 and 1:10, the preferred ratio being between 1:2 and 1:5.

Carbon which has been fabricated by the process in accordance with the invention shows a good output capacity for use as oxygen electrode in fuel cell elements. An electrode, which for instance, contains only 20 mg of carbon per $cm^2$, which has been obtained through the carbonization of polyacrylonitrile in the presence of zinc chloride, delivers in 1 m $H_2SO_4$ at a temperature of 60°C a current density of 30 mA/$cm^2$ at a potential of 700mV, measured against the reversible hydrogen potential. In comparison thereto, the best activated carbon taken from a series of tested carbons, available commercially under the name of LEV 585, and under the same operating conditions, could be loaded only to 1/10 of this current density, namely to 3 mA/$cm^2$. The activity of a carbon which has been made from polyacrylonitrile without addition of zinc chloride during the carbonization, as already mentioned, is extremely small. Under the conditions mentioned above, carbon which has been made in this manner does not provide a measurable current.

The process in accordance with the invention may be further advantageously enlarged in that the ground carbon is additionally activated in an ammonia stream. This may be carried out in a known manner by means of heating in an ammonia atmosphere.

An additional activation of the carbon may advantageously be also obtained in that during the dissolution of the nitrogen containing polymers in the salt solution, a soluble, nitrogen containing compound is added. Preferably, compounds are used therefor, which contain more nitrogen than the polymers, for instance melamine (2.4.6–triamino–1.3.5-triazine), urea or urotropine (hexamethylentetramine). Such compounds, just as ammonia, result in an increased nitrogen content of the final carbon. The increased nitrogen content is of great significance, since the carbon thereby acquires a greater stability in respect to the oxygen. Furthermore, a higher nitrogen content contributes substantially to the fact that the carbon crystal grid in the carbon is badly distorted and in that the crystallites formed during its fabrication remain small. These effects influence the electrochemical properties of carbon in a beneficial manner.

The method of the invention, together with additional objects and advantages thereof will be best understood from the following description:

The invention will be further explained with reference to several exemplified embodiments and a FIGURE.

Comparative Experiment a. Fabrication of carbon through the carbonization of polyacrylonitrile without additives:

10 g of polyacrylonitrile in powder-form are heated in a tubular oven in the presence of a current of argon as a protective gas with a heat-up rate of 5°C per minute to a temperature of 1000°C and left for one hour at this temperature. The resultant carbon is crushed and a grain fraction < 100 $\mu$ is screened out.

b. Manufacture of an electrode:

250 mg of powdery carbon obtained in this manner are deposited on an asbestos diaphragm, the free surface of which comprises 12.5 $cm^2$ as a thin powder layer by means of sedimentation. In this case, it has been found to be of advantage that powdery material should at first be treated before the sedimentation in a sedimentation fluid with ultrasound, in order to separate the individual particles from one another and to facilitate their wetting thereby. The diaphragm, together with the separated carbon is dried and assembled into the known half cell arrangement in accordance with the principle of the supported electrode. For the purpose of reinforcement of the asbestos paper cover layer, that is of the diaphragm, an apertured sheet metal of tantalum is used on the side of the electrolyte and a net made out of polypropylene. The contact and support of the powdery materials on the gas side is attained by means of a carbon web and a gilded, perforated tantalum sheet.

c. Electrochemical Measurements:

The electrode obtained in the above manner, with a coating of 20 mg carbon per $cm^2$, is maintained potentiostatic at 60°C in 1 m $H_2SO_4$ under an oxygen pressure of $2 \cdot 10^5$ $N/m^2$ at a potential of 700 mV, measured against the reversible hydrogen electrode. At this potential, no measurable reduction current is observed. Only at potentials which are more negative than 500 mV, a measurable cathodic current is flowing. At a potential of 500 mV, the current density comprises 3 mA/$cm^2$.

EXAMPLE 1 a. Fabrication of nitrogen containing, powdery carbon:

10 g polyacrylonitrile are mixed with 50 ml of a watery solution of 1000 g zinc chloride per liter, and totally dissolved through heating of the mixture to 100°C. The completely clear and viscous solution is introduced into a quartz boat and is heated in a tubular oven in a nitrogen atmosphere with a heat-up rate of 2°C per minute up to 1000°C and maintained for one hour at this temperature. The carbon obtained thereby, is crushed and screened out as in the comparison experiment.

b. Electrochemical Measurements:

The powdery carbon, which has been fabricated in accordance with example 1a, is included into an electrode, as in the comparison example. The measurements undertaken on this electrode, under the same conditions as in the comparison example, provide a current of 30 mA/cm$^2$ at a potential of 700 mV. The long term behavior of such an electrode will be considered separately.

Comparative measurements of commercially available activated carbons provided only low current densities. The best behavior out of the series of tested carbons was shown by an activated carbon, commercially available under the name of Lev 585, which, under the circumstances in accordance with the comparison example, provided a current density of 3 mA/cm$^2$. The current densities which were measured for the other carbons were found to be below this value.

Samples of glucose, treated in accordance with example 1a, provided carbons which, after the inclusion into electrodes, did not deliver measurable current, either.

EXAMPLE 2

10 g of polyacrylonitrile were mixed with 100 ml of a watery solution, which contained 500 g zinc chloride per liter. After heating of the mixture for one hour up to 100°C, the polyacrylnitrile had completely dissolved. The carbonization was then achieved, as described in Example 1. The resultant carbon, corresponding to Example 1, was then included into an electrode and furnished, under the conditions given therein, a current density of 25 mA/cm$^2$.

EXAMPLE 3

10 g polyacrylonitrile are mixed with 20 ml of a watery solution of 1000 g zinc chloride per liter and homogenized through heating up to 100°C. The viscous solution is brought into a quartz boat and heated in a tubular oven in the presence of a nitrogen atmosphere with a heating rate of 2°C per minute to 900°C and kept at this temperature for one hour. The carbon obtained thereby is subsequently crushed, screened and assembled into an electrode. The electrode furnished, under the conditions as per example 1, a current density of 20 mA/cm$^2$.

EXAMPLE 4

4 g of carbon, made in accordance with Example 1, are heated in a tubular oven in the presence of an ammonia atmosphere in one hour up to 850°C and held at this temperature for three hours. 350 mg of powdery carbon activated in this manner is assembled into an electrode as in the comparison example. The electrochemical measurements, corresponding to those of the comparison example, furnish, at an oxygen pressure of 2.6 · 10$^5$ N/m$^2$ and a coating of 30 mg/cm$^2$, a current density of 80 mA/cm$^2$. The current-time curve will be considered separately.

For purposes of comparison, 5 g of the carbon, commercially available under the name of Lev 585, was activated with ammonia under the same conditions. An electrode comprised of this carbon, furnished under the conditions given in the comparison example, an initial current density of 48 mA/cm$^2$. The current time-curve will also be considered separately.

EXAMPLE 5

5 g of powdery polyacrylonitrile are dissolved while being heated in 40 ml of a watery zinc chloride solution, which contains 1000 g zinc chloride per liter in solution. While stirring, 4 g of melamine are added to this solution. The mixture obtained thereby is heated, while stirring, to a point of boiling, until a complete dissolution has taken place. The clear solution is heated to 1000°C in a tubular oven within three hours. During this process, the arrangement is flushed with purified nitrogen up to a temperature of 700°C. In the temperature range of 700° to 1000°C, the supply of nitrogen is turned off. The test sample is subsequently kept for one hour at a temperature of 1000°. The resultant carbon is crushed in a mortar, screened, and a portion with a particle size of under 32 $\mu$ is used for the fabrication of an electrode.

The electrode, made as in the comparison example and which has been tested under the same conditions, supplies a current density of about 51 mA/cm$^2$. In such a carbon, at the beginning of the loading, the current does not fall off as much as with similarly fabricated carbons which, however, have been activated with ammonia.

The FIGURE in graphical representation shows current-time curves of different electrodes. The time t is shown as an abscissa in hours and the current density i as the ordinate in mA/cm$^2$. The electrodes having a coating of 20 or, as the case may be, 30 mg/cm$^2$. The measurements were undertaken in 1 m H$_2$SO$_4$ at a temperature of 60°C. The oxygen pressure was 2 · 10$^5$ N/m$^2$, the polarization 700 mV, measured against the reversible hydrogen potential.

Graph 1 shows the behavior of an electrode which is comprised of activated carbon, obtainable commercially under the name of Lev 585, which was subject to the activation in an ammonia current. The current density with a coating of 20 mg/cm$^2$, which initially was 48 mA/cm$^2$, falls off relatively fast and stabilizes at a value of about 8 mA/cm$^2$. Curve 2 shows the behavior of an electrode made as in Example 1, which, in accordance with the process of the invention, has been obtained through carbonization of polyacrylonitrile. The current density (coating : 20 mg/cm$^2$) amounts, at the beginning of the test, to 30 mA/cm$^2$, and after about 160 hours, stabilizes at a value of about 13 mA/cm$^2$. Curve 3 shows the behavior of an electrode consisting of carbon, made as in Example 4, that is, by carbonization of polyacrylnitrile by the process in accordance with the invention and subsequent activation with ammonia. With a coating of 30 mg/cm$^2$, a current density of 80 mA/cm$^2$ is obtained at the beginning of the measurement, which stabilizes after 150 hours at a value of about 29 mA/cm².

Graph 4 shows the behavior of an electrode consisting of carbon, made as in Example 5, that is, through carbonization of polyacrylonitrile, in accordance with the process of the invention, with the addition of melamine. This electrode show a relatively constant long-term behavior. After an initial current density of 51 mA/cm², the current density stabilizes after 170 hours at the relatively high value of about 37 mA/cm² (coating: 20 mg/cm²).

It is thus clearly evident from these curves that carbon, made in accordance with the process of the invention, shows, in electrodes, a smaller deactivation than electrodes made from commercially available carbons.

In the process in accordance with the invention, for the purpose of making nitrogen containing powdery carbon, in addition to polyacrylonitrile, other carbonizable nitrogen containing organic polymers may also be used, for instance, polyethylenimine. Proteins, also, may be used for the fabrication of powdery, nitrogen containing carbon. However, the activation and stability of such carbons is not as good as that of carbons which have been made from polyacrylonitrile and corresponding polymers. Carbon made in accordance with the process of the invention is not limited to the application in electrochemical cells. Such carbon may also be used for other purposes, for instance, as catalyzer for auto-oxidation reactions.

Although the invention is illustrated and described herein as process for the fabrication of nitrogen containing pulverized carbon, it is nevertheless not intended to be limited to the details shown, since various modifications may be made therein without departing from the spirit of the invention and within the scope and range of equivalents of the claims.

It is claimed:

1. Process for making an activated pulverized carbon for use as electrode material, comprising the steps of mixing a carbonizable, nitrogen containing organic polymer into a concentrated inorganic salt solution selected from the group consisting of halides and thiocyanates, heating said mixture until the polymer has completely dissolved; carbonizing the resultant viscous fluid at temperatures between 700° and 1200°C, and crushing the resultant carbonaceous product.

2. Process in accordance with claim 1, wherein polyacrylonitrile is added to a concentrated watery solution of zinc chloride in a ratio of the polyacrylnitrile to the salt of 1:1 to 1:10, the mixture is heated to a temperature of 100°C to a complete dissolution of the polyacrylnitrile, and the resultant solution is heated in a nitrogen atmosphere at a heating rate of 1° to 10°C per minute up to 700° to 1200°C, the temperature is maintained at the value of the final temperature until attainment of carbonization.

3. Process in accordance with claim 2, wherein said ratio of the polyacrylonitrile to the salt is between 1:2 to 1:5, the heating rate is 2° to 6°C per minute, and the solution is heated to between 900° to 1000°C.

4. Process in accordance with claim 1, including the step of activating the crushed carbon in an ammonia stream.

5. Process in accordance with claim 1, including the step of adding a soluble nitrogen-containing compound, during the dissolution of the nitrogen-containing polymer in the salt solution, whereby an additional activation of the carbon is effected.

6. The process according to claim 5, wherein said added compound comprises melamine.

* * * * *